United States Patent [19]
Janisse et al.

[11] Patent Number: 5,565,720
[45] Date of Patent: Oct. 15, 1996

[54] REMOTE MOTOR SWITCH AND CAPACITOR ASSEMBLY

[75] Inventors: Dwight C. Janisse; Jay R. Janisse, both of Troy, Mich.

[73] Assignee: Dwight C. Janisse & Associates, Inc., Troy, Mich.

[21] Appl. No.: 136,227

[22] Filed: Oct. 13, 1993

[51] Int. Cl.$^6$ ...................................................... H02K 11/00
[52] U.S. Cl. ........................................... 310/68 A; 310/71
[58] Field of Search ............................ 310/68 A, 71; 200/293, 298, 303

[56] References Cited

U.S. PATENT DOCUMENTS

| | | | |
|---|---|---|---|
| 701,914 | 6/1902 | Moody | 310/68 A |
| 3,931,486 | 1/1976 | Raetz | 200/298 |
| 4,135,171 | 1/1979 | Violet | 200/293 |
| 4,535,397 | 8/1985 | May | 362/369 |
| 4,628,236 | 12/1986 | Schaefer | 310/68 A |
| 4,789,135 | 12/1988 | Watanabe | 200/298 |
| 4,844,421 | 7/1989 | Kojima | 200/298 |
| 5,010,563 | 4/1991 | Laurent et al. | 310/71 |
| 5,015,155 | 5/1991 | Brown | 310/89 |
| 5,130,587 | 7/1992 | Janisse et al. | 310/89 |

Primary Examiner—Steven L. Stephan
Assistant Examiner—Clayton E. LaBalle
Attorney, Agent, or Firm—Howard & Howard

[57] ABSTRACT

An industrial electric fan motor has a remote hand set in which both a switch and a motor capacitor are disposed. The remote hand set is connected to a casing of the fan motor by a control cord with a selectively engageable plug. The switch and the capacitor are serviced by disconnecting the hand set from the motor by unplugging it and plugging in a replacement remote hand set.

4 Claims, 1 Drawing Sheet

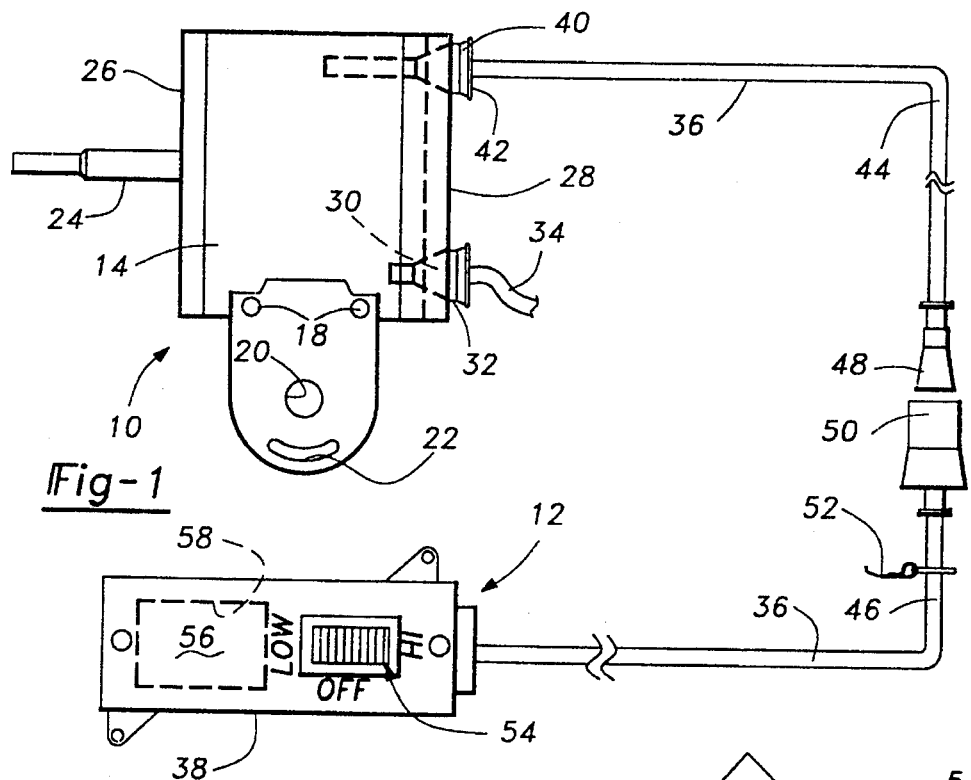
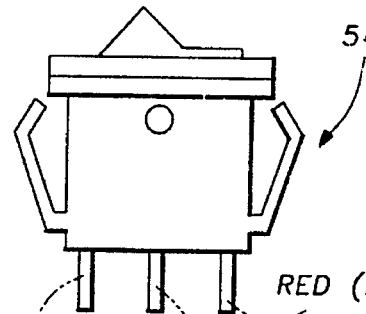
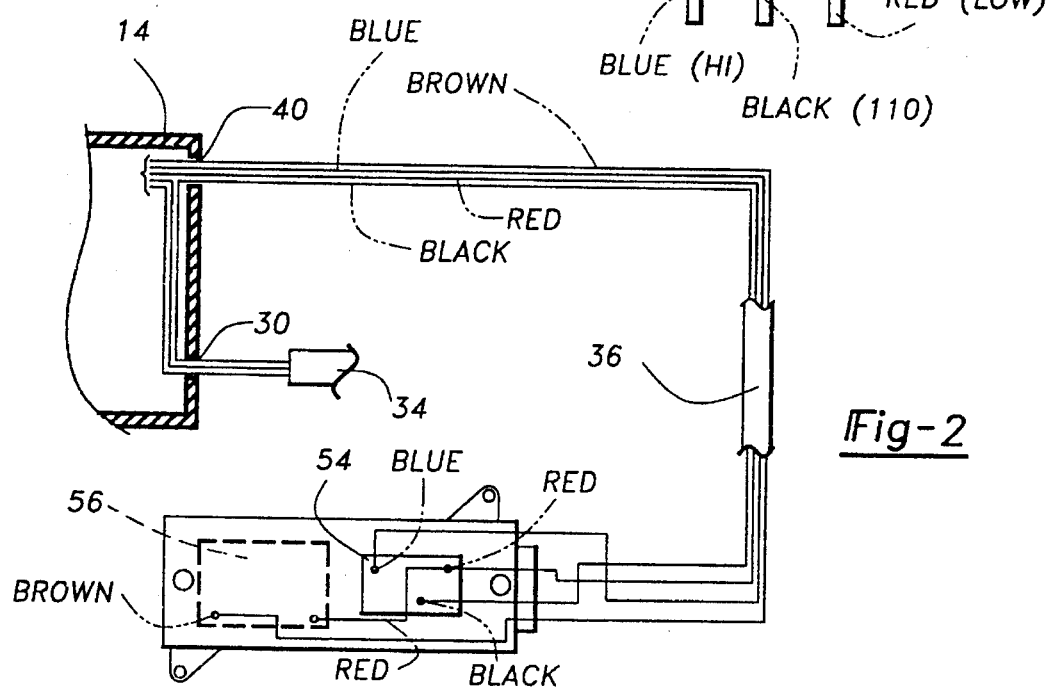

5,565,720

REMOTE MOTOR SWITCH AND CAPACITOR ASSEMBLY

FIELD OF THE INVENTION

This invention relates to electrical motors. More specifically, it relates to industrial electric fans and fan controls.

BACKGROUND OF THE INVENTION

Industrial electric fans may include a motor casing enclosed at one end by a removable modular end dome. Generally, the end dome has mounted thereto a power cord, a motor switch and a motor capacitor. An example of a present day electrical fan motor modular end dome is disclosed in U.S. Pat. No. 4,517,481.

Two of the most frequently serviced components in an industrial fan are the switch and the motor capacitor. Replacing these components is facilitated by placing them together in a removable modular end dome. However, replacement of either the switch or the capacitor in present day fans is still very time consuming and consequently very expensive. A technician must first access the modular end dome. This may require the assembly of scaffolding or the use of an alternative lifting device for the technician to reach the fan. Once the technician has accessed the fan he must use tools to remove the end dome, and then reassemble the fan with a new end dome. In many circumstances, it may be necessary to wait until there is a lull in manufacturing activity to permit the technician to access the fan. This concern has been partially addressed by the fan motor switch disclosed in U.S. Pat. No. 5,130,587 which discloses a drop cord with a two-speed electric motor switch at the end of the drop cord remote from the modular end dome.

SUMMARY OF THE INVENTION

The present invention provides a remote hand set which completely replaces the removable modular end dome. The remote hand set enables a technician to simultaneously replace both the switch and the motor capacitor in less than a minute without the need to access the fan motor. This greatly reduces the cost of maintaining electric fan motors. The remote hand set includes a switch/capacitor box having both the switch and the motor capacitor disposed therein. An electrical control cord with a selectively engageable plug is disposed between the motor casing and the switch/capacitor box. The control cord electrically connects the capacitor and the switch with the motor field coil. The switch and capacitor are easily replaced by a technician by merely disconnecting the switch/capacitor box from the motor at the plug and substituting a new switch/capacitor box. The elimination of the modular end dome has the secondary effect of eliminating the need for components associated with the end dome such as an electrical connector between the end dome and the motor casing and bracketry and fasteners for mounting the capacitor in the modular end dome as well as fasteners attaching the end dome to the motor casing. This invention has the further advantage of providing an electric fan motor made smaller in size with the elimination of the modular end dome. Smaller fan motors are advantageous because they reduce the amount of warehouse space needed for storing a given quantity of fans, and also reduce the cost of packaging and shipping fans.

BRIEF DESCRIPTION OF THE DRAWINGS

FIG. 1 is a diagrammatic representation of a fan motor casing and a connecting remote hand set.

FIG. 2 is a schematic representation of the electrical connections between the remote hand set and the fan motor casing.

FIG. 3 is a side view of a two speed switch.

DESCRIPTION OF THE PREFERRED EMBODIMENTS

FIG. 1 shows an electric fan motor 10 having a remote hand set 12. A motor casing 14 has a motor field coil disposed therein. The motor casing 14 is provided with a pair of mounting brackets 16, each welded to the motor casing 14 at two points 18. The mounting bracket 16 is provided with a pivot pin hole 20 for receiving a suitable pivot pin, not shown, for mounting the fan motor upon a supporting bracket, not shown, which may be attached to a wall surface, a floor stand, structural steel or other conventional fan support structure. The bracket 16 also includes an adjustment screw receiving slot 22 for locking the angular position of the fan motor 10 on its supporting structure. A drive shaft 24 rotatably connected with the motor field coil extends from a front end 26 of the casing 14. This configuration is very similar to that shown in U.S. Pat. No. 5,130,587 issued to Janisse et al on Jul. 14, 1992, which is hereby incorporated by reference.

In accordance with the invention, a rear end 28 of the motor casing 14 has a flat or plate shape. The rear end 28 of the motor casing 14 is provided with a first HEYCO fitting hole 30. Alternatively, the hole 30 could be placed in a side of the casing proximate to the rear end 28. Operatively mounted in the HEYCO fitting hole 30 is a HEYCO fitting or strain relief connection member 32 on one end of a conventional power cord 34. HEYCO fittings are standard or conventional strain relief fittings, and they are available from HEYCO MOLDED PRODUCTS, INC., Box 160, Kenilworth, N.J. 07033, under Model No. 6N 3-4. The power cord has formed on the other end thereof, a male connector member, not shown, and a connector clamp, not shown, for securing the power cord to a suitable power extension cord in turn connected to a power source. It is also contemplated, in an alternative embodiment, that power cord 34 enter directly into hand set 12 from a source of power. The power could then be delivered to motor 10 by way of conductors located within cord 36 (such conductor not shown).

The remote hand set 12 is connected to the rear 28 of the motor casing 14. Other connecting sites on the motor casing 14, such as a side proximate to the rear end 28 may be alternatively used. A switch/capacitor control cord 36 of the hand set 12 connects a switch/capacitor box 38 with the motor casing 14. A second HEYCO fitting hole 40 is disposed in the rear 28 of the motor casing 14. Again, other locations on the casing 14 may also be appropriate connecting sites. Operatively mounted in the second fitting hole 40 by means of a HEYCO fitting or strain relief connection member 42 is the control cord 36. The control cord 36 has a first part 44 and a second part 46. The first part 44 extends from the HEYCO fitting 42 at the rear 28 of the casing 14 to a female connector 48 adapted to be received by a male connector 50 which is one end of the second part 46 of the control cord 36. The second part 46 of the control cord 36 extends from the male connector 50 into the switch/capacitor box 38. Both the first part and the second part 44, 46 are fairly short. The second part 46 is only about one foot long, permitting an operator or technician to reach the engaged control cable connectors 48, 50 without the aid of a ladder or hoist. One or more extension cords, not shown, with clamp members 52 are used when the distance between the fan motor 10 and the operator become too great for the first and second parts 44, 46 of the control cord 36.

The switch/capacitor box 38 has mounted therein a two-speed switch 54 and a conventional motor capacitor 56. A suitable two-speed switch 54 is illustrated in FIG. 3. The preferred switch is known as a McGill rocker switch Model No. 0805-1253, and is available from the McGill Switch Company, a division of the McGill Manufacturing Company, Inc. of Valparaiso, Ind. 46383. The switch 54 has three positions, namely a low speed position, a high speed position and an off position.

The motor capacitor 56 is rectangular in shape and is preferably mounted in a separate compartment 58 in the switch/capacitor box 38 proximate to the switch 54. The separate compartment guards against damage due to leakage of the capacitor 56. Electrical conductors in the control cord 36, schematically represented in FIGS. 2a and 2b, electrically connect the switch 54 and the capacitor 56 (in the switch/capacitor box 38) with the motor field coil and power cord 34.

Electrical conductors have been marked with the usual color scheme for cooperation with the mating color coded electrical conductors in the power cord 34, the switch/capacitor control cord 36 and the McGill switch 54. The color codes for the prongs on the McGill switch are labeled in FIG. 3 and they match the same color codes for the electrical conductors shown in FIGS. 2a and 2b. The electrical conductors returning from the switch/capacitor box 38 are connected to the appropriate electrical components within the motor casing 14 thereby electrically connecting the components in the switch/capacitor box 38 with the motor field coil.

A significant advantage of an electrical fan motor 10 equipped with the remote hand set 12 of the present invention is readily apparent when there is a need to service the fan motor 10. Failure of the switch 54 and failure of the motor capacitor 56 are typically the two leading repair items on industrial electrical fan motors 10. Removing and replacing switches 54 and capacitors 56 mounted in a modular end dome as described in U.S. Pat. No. 5,130,587 is often inconvenient because of the inaccessible location of the fan motor 10 and the need for tools in removing and installing the end dome.

The present invention greatly facilitates removal and replacement of both the switch 54 and the capacitor 56. A service technician can quickly repair most fan problems by simply removing the remote hand set 12 by unplugging the connectors 48 and 50 by reaching no higher than his head. A functional hand set 12 is then plugged in and the clamp member 52 replaced to put the fan motor 10 back in operation. The entire procedure requires no tools and approximately ten seconds to execute. The defective hand set 12 is then returned to a maintenance area for replacement of the defective part. The rebuilt hand set 12 is then placed in stock to be used as a future replacement.

It is appreciated that this preferred embodiment does not illustrate the entire scope of the invention. Differing fan applications may result in varying embodiments. It may be advantageous in some circumstances to have the power cord connect to the switch/capacitor box instead of to the motor casing.

What is claimed is:

1. An electric fan motor comprising:

a motor casing;

a motor field coil disposed in the casing;

a power cord extending from the casing;

a remote hand set including a switch and a motor capacitor disposed in a switch/capacitor box and electrically connected to the motor field coil by a control cord with a selectively engageable plug wherein complete electrical servicing of the switch and capacitor is executed by unplugging the hand set and replacing it with a functioning hand set.

2. An electric fan motor as claimed in claim 1, wherein the plug in the control cord is within reach of a fan operator standing on the ground thereby facilitating replacement of the hand set.

3. An electric fan motor as claimed in claim 1, wherein the switch in the remote hand set is a two-speed switch.

4. A remote handset as claimed in claim 1, wherein the switch and the capacitor are disposed in separate compartments sealingly separated within the switch/capacitor box.

* * * * *